United States Patent
Shi et al.

(10) Patent No.: US 9,071,357 B1
(45) Date of Patent: Jun. 30, 2015

(54) DATA COMMUNICATIONS SYSTEM INCLUDING AN OPTICAL FIBER DATA LINK DISPOSED BETWEEN SERIAL BIDIRECTIONAL ELECTRICAL DATA BUSSES

(71) Applicant: Emcore Corporation, Albuquerque, NM (US)

(72) Inventors: Feng Shi, Irvine, CA (US); Sang Lee, Encinitas, CA (US)

(73) Assignee: EMCORE Corporation, Alhambra, CA (US)

( * ) Notice: Subject to any disclaimer, the term of this patent is extended or adjusted under 35 U.S.C. 154(b) by 0 days.

(21) Appl. No.: 14/329,682

(22) Filed: Jul. 11, 2014

(51) Int. Cl.
- *H04B 10/69* (2013.01)
- *H04B 10/516* (2013.01)
- *H04B 10/2575* (2013.01)

(52) U.S. Cl.
CPC .......... *H04B 10/2575* (2013.01); *H04B 10/697* (2013.01); *H04B 10/516* (2013.01)

(58) Field of Classification Search
CPC ............................ H04B 10/69; H04B 10/6973
USPC ................................. 398/159, 193, 194, 208
See application file for complete search history.

(56) References Cited

U.S. PATENT DOCUMENTS

| | | | |
|---|---|---|---|
| 4,281,253 A | 7/1981 | Culver | |
| 4,726,010 A | 2/1988 | Ali et al. | |
| 4,748,689 A | 5/1988 | Mohr | |
| 5,119,223 A | 6/1992 | Panzer et al. | |
| 5,272,558 A * | 12/1993 | Canestri et al. | 398/177 |
| 6,288,813 B1 * | 9/2001 | Kirkpatrick et al. | 398/136 |
| 6,831,926 B1 | 12/2004 | Kinstler | |
| 7,382,845 B1 * | 6/2008 | Shenoi | 375/361 |
| 7,734,183 B2 * | 6/2010 | Whitehead | 398/135 |
| 2001/0003205 A1 * | 6/2001 | Gilbert | 713/320 |
| 2005/0058118 A1 | 3/2005 | Davis et al. | |
| 2006/0067705 A1 | 3/2006 | Paulsen | |
| 2006/0275038 A1 | 12/2006 | Walton et al. | |
| 2008/0013569 A1 | 1/2008 | Boren | |
| 2008/0187313 A1 | 8/2008 | Farmer et al. | |
| 2009/0304387 A1 | 12/2009 | Farries et al. | |
| 2013/0027228 A1 | 1/2013 | Govindammagari et al. | |
| 2013/0315359 A1 * | 11/2013 | Felder et al. | 375/362 |
| 2014/0064743 A1 * | 3/2014 | Geyer et al. | 398/182 |
| 2014/0211894 A1 * | 7/2014 | Yang | 375/354 |

FOREIGN PATENT DOCUMENTS

EP          0171080 A2    2/1986

OTHER PUBLICATIONS

Musunuri; An Oversampling Technique for Serial Protocols; EE Times, Oct. 7, 2013 [online], [retrieved on Sep. 12, 2014]. Retrieved from the Internet <URL: http://www.eetimes.com/author.asp?section_id=36&doc_id=1319733&>.*

(Continued)

*Primary Examiner* — Nathan Curs

(57) ABSTRACT

An optical fiber data communications network in which an electro-optical transceiver couples a plurality of serial electrical data buses over a single bidirectional optical fiber link, and includes a controller that functions by oversampling the digital electrical signal on each of such buses, multiplexes them, and converts the signal into a high speed optical signal for transmission over an optical fiber.

20 Claims, 8 Drawing Sheets

(56) References Cited

OTHER PUBLICATIONS

MIL-STD-1553 Designer's Guide, sixth edition, Dec. 8, 2003, [retrieved on Sep. 12, 2014]. Retrieved from the Internet <URL: https://web.archive.org/web/20120323181622/http://www.ddc-web.com/Documents/dguidehg.pdf>.*

Banerjee et al., "Wavelength-Division-Multiplexed Passive Optical Network (WDM-PON) Technologies for Broadband Access: A Review," *Journal of Optical Networking*, Nov. 2005 4(11):737-758.

Baumbick, "Status of the Fiber Optic Control System Integration (FOCSI) Program," NASA Technical Memorandum, May 1993; 17 pgs.

Glass, "1553 Wire-to-Fiber Converter," Data Device Corporation, Bohemia, NY, 2000; 4 pgs.

Hegarty, "High Performance 1553," Data Device Corporation, Bohemia, NY, 2010; 16 pgs.

"MIL-STD-1553 Designer's Guide, Sixth Edition," Data Device Corporation, Bohemia, NY, Dec. 2003; 367 pgs.

"MIL-STD-1553 Protocol Tutorial," Avionics Interface Technologies, Omaha, NE, Sep. 2010; 83 pgs.

Wester, "Fiber-Optic Implementation of MIL STD-1553, A Serial Bus Protocol," Master's Thesis, Naval Postgraduate School, Monterey, CA, Mar. 1987; 107 pgs.

* cited by examiner

O - data sample

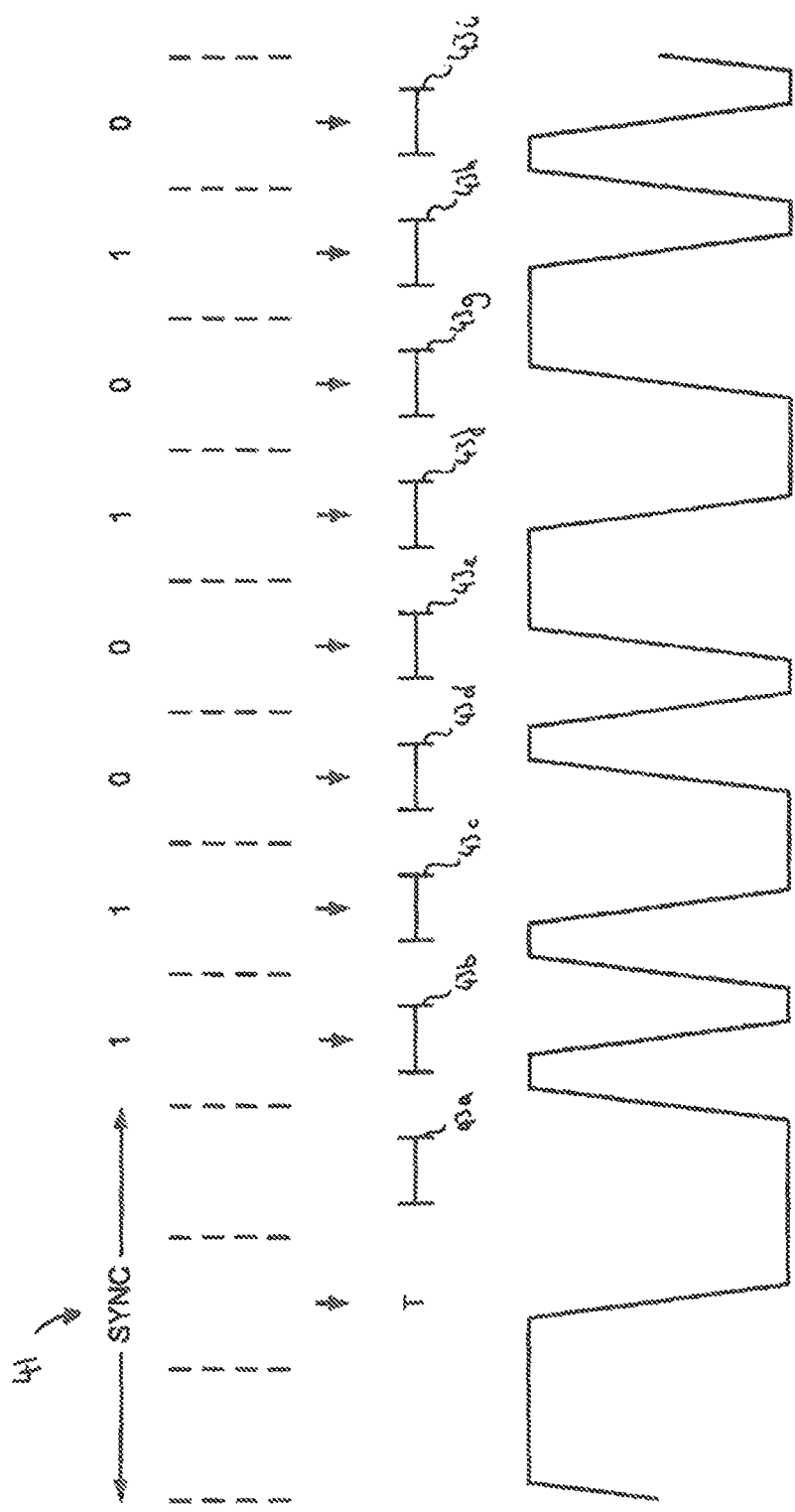

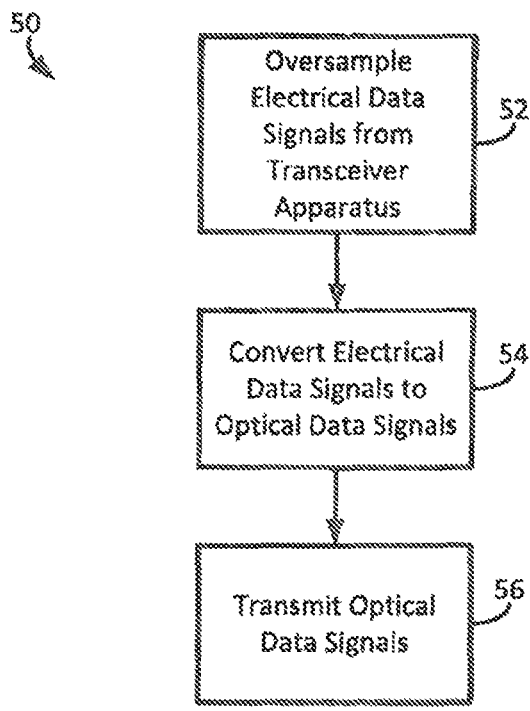

DATA COMMUNICATIONS SYSTEM INCLUDING AN OPTICAL FIBER DATA LINK DISPOSED BETWEEN SERIAL BIDIRECTIONAL ELECTRICAL DATA BUSSES

BACKGROUND OF THE INVENTION

1. Field of the Invention

The disclosure herein relates to systems, apparatus, and methods for providing an optical fiber data link between bidirectional serial electrical data busses, and in particular MIL-STD 1553-type electrical busses.

2. Description of Related Art

Conventional electrical data busses for use in data communications systems, such as MIL-STD 1553-type electrical busses, utilize wires to transfer data between the different nodes (e.g., transceivers, etc.) on the bus. Electrical data busses may have some disadvantages. For example, for an electrical bus to work properly, the electrical wires between nodes may have a maximum length depending on multiple factors such as, e.g., type of conductive material used in the electrical wires, the gauge of the conductor used in the electrical wires, impedance of the electrical wires, etc. Further, the electrical wires of the electrical data buses may also be bulky and heavy.

Wire-to-fiber converters have been proposed to extend individual electrical busses as described in "Application Notes: 1553 Wire-to-Fiber Converter," Data Device Corporation, 2000, of Bohemia, N.Y. Such an optical extension has the disadvantage that the process of converting the electrical signal into an optical signal at one end of the optical fiber and then converting the resultant optical signal at the other end of the optical fiber into an electrical signal introduces noise. U.S. Pat. App. Pub. No. 2009/0304387 entitled "Optical Data Networks For Bilateral Communication Between A Plurality Of Nodes" published on Dec. 10, 2009, which is hereby incorporated by reference in its entirety, proposes an alternative approach in which, in effect, the electrical bus is replaced in its entirety by an optical bus. However, it is often desirable to retain at least partially the electric buses, for example in systems where the electric buses have been proven to work reliably.

SUMMARY OF THE INVENTION

1. Objects of the Disclosure

It is an object of the disclosure to provide a robust bidirectional serial data communications network having spaced apart electrical bus portions and an optical fiber communication link between the electrical bus portions.

It is another object of the disclosure to provide an optical transmitter for oversampling information-containing electrical signals and converting such digitized signal samples into an optical signal for transmission over a single high data rate (2.5 GHz or greater) optical fiber channel.

It is another object of the disclosure to provide a method to convert and transmit MIL-STD 1553 electrical bus signals over an optical fiber link, and convert the received optical signals into MIL-STD 1553 electrical bus signals.

It is another object of the disclosure to convert a Manchester encoded electrical signal into an optical signal for transmission over an optical fiber data link.

It is another object of the disclosure to oversample an encoded digital signal by a factor of at least 100 to reliably transmit over an optical data link and recover the clocking information in such signal at the received.

It is another object of the disclosure to provide a compensation circuit at the receiver of an optical communication network to adjust the DC level of the received signal to compensate for the distortion introduced in downstream electrical encoding interface circuitry.

Some implementations or embodiments may achieve fewer than all of the foregoing object.

2. Features of the Disclosure

Briefly and in general terms, the present disclosure provides communications network comprising: first bidirectional serial electrical bus having a first data rate and using a predetermined electrical data protocol for coupling with a plurality of network nodes; an interface controller coupled to the electrical bus implemented on a single integrated circuit semiconductor device for sampling the digital signals on the first electrical bus by a factor of at least fifty times the first data rate and encoding the electrical signal into a second digital signal for transmission at a second data rate substantially greater than the first data rate; an electro-optical transmitter coupled to the interface controller for converting the second digital signal into an optical signal at a first optical frequency for transmission over an optical fiber; an optical fiber coupled to the electro-optical transmitter for transmitting the optical signal to a remote receiver; an electro-optical receiver coupled to the optical fiber for converting the optical signal into an electrical signal; and an interface controller coupled to the electro-optical receiver for converting the electrical signal from the electro-optical receiver and encoding the electrical signal into a digital signal for transmission on a second bidirectional serial electrical bus using said predetermined electrical data protocol.

In another aspect, there is provided a communications network in which a first electro-optical apparatus is interconnected between a first plurality of serial electrical data buses and an optical fiber and a second electro-optical apparatus is interconnected between the optical fiber and a second plurality of serial electrical data buses.

In some embodiments, each electro-optical apparatus comprises a plurality of electrical transceivers, with each electrical transceiver being arranged to convert an electrical signal received from a respective serial electrical data bus into a corresponding serial receive signal and to convert a serial transmit signal into a corresponding electrical signal in said respective serial electrical data bus, and an optical transceiver arranged to convert a parallel transmit signal into an optical signal for transmission into the optical fiber and to convert an optical signal received from the optical fiber into a parallel receive signal.

In some embodiments, processing apparatus is coupled between the plurality of electrical transceivers and the optical transceiver, the processing apparatus being arranged to multiplex serial receive signals from the plurality of electrical transceivers in the generation of the parallel transmit signal for transmission through the optical fiber, and to de-multiplex the parallel receive signal received from the optical fiber in the generation of the serial transmit signals for transmission over the corresponding plurality of serial electric data buses.

In some embodiments, processing apparatuses of the first and second electro-optical apparatuses are arranged to reproduce substantially electrical signals received from the first plurality of electric data buses in respective ones of the second plurality of electric data buses and to reproduce substantially electrical signals received from the second plurality of electric data buses in the corresponding respective ones of the first plurality of electric data buses. In this way, a plurality of serial electrical buses are extended transparently through a single optical fiber.

In another aspect, there is provided an electro-optical apparatus comprising processing apparatus arranged to process a received electrical signal, wherein the processing apparatus comprises a signal sampler arranged to oversample the received electrical signal; and an electro-optical converter arranged to convert the signal output by the processing apparatus into an optical signal for transmission into an optical fiber.

In a further aspect, there is provided electro-optical apparatus comprising an optical receiver arranged to convert an optical signal received from an optical fiber into a corresponding electrical signal, processing apparatus arranged to process the corresponding electrical signal, and at least one electrical transmitter arranged to transmit the signal output by the processing apparatus on a respective serial electrical data bus, wherein the processing apparatus comprises a pre-distorter arranged to introduce pre-distortion to compensate for distortion generated by the electrical transmitter.

The above summary of the present disclosure is not intended to describe each embodiment or every implementation thereof. Advantages, together with a more complete understanding of the present disclosure, will become apparent and appreciated by referring to the following detailed description and claims taken in conjunction with the accompanying drawings.

BRIEF DESCRIPTION OF THE DRAWINGS

The invention will be better and more fully appreciated by reference to the following detailed description when considered in conjunction with the accompanying drawings, wherein:

FIG. 7 schematically shows the beginning of a data word transmitted in the electric bus network system of FIG. 1.

FIG. 8 is a flow chart showing operations performed by the electro-optical apparatus illustrated in FIG. 3 on receipt of an electrical signal.

GLOSSARY

Serial electrical bus—a communication system that utilizes one or more electrical conductors to transfer data between different network components in which only one data symbol is conveyed by the communication system at any time.

MIL-STD 1553 electrical bus—a serial electrical bus complying with the MIL-STD-1553 protocol.

Oversampling—sampling a bandlimited signal at a frequency substantially above twice the bandwidth.

Manchester encoded signal—a signal conveying data bits in which each data bit period has at least one transition to aid clock recovery.

SFP (Small form factor pluggable) optical module—a hot pluggable component whose form factor and electrical interface conforms to a specification available for download at ftp://ftp.seagate.com/sff.

8 b/10 b encoding—an encoding scheme that maps 8 bit data symbols into 10 bit line code symbols in a manner that maintains DC balance and provides sufficient state transitions for clock recovery.

64 b/66 b encoding—an encoding scheme that maps 64 bit data symbols into 66 bit line code symbols.

DETAILED DESCRIPTION OF EXEMPLARY EMBODIMENTS

By way of example, apparatus and methods for use in extending an electrical bus are now described with reference to FIGS. 1-8. It will be apparent to one skilled in the art that other embodiments may be utilized and structural changes may be made without departing from (e.g., still falling within) the scope of the disclosure presented hereby.

Figure 1:
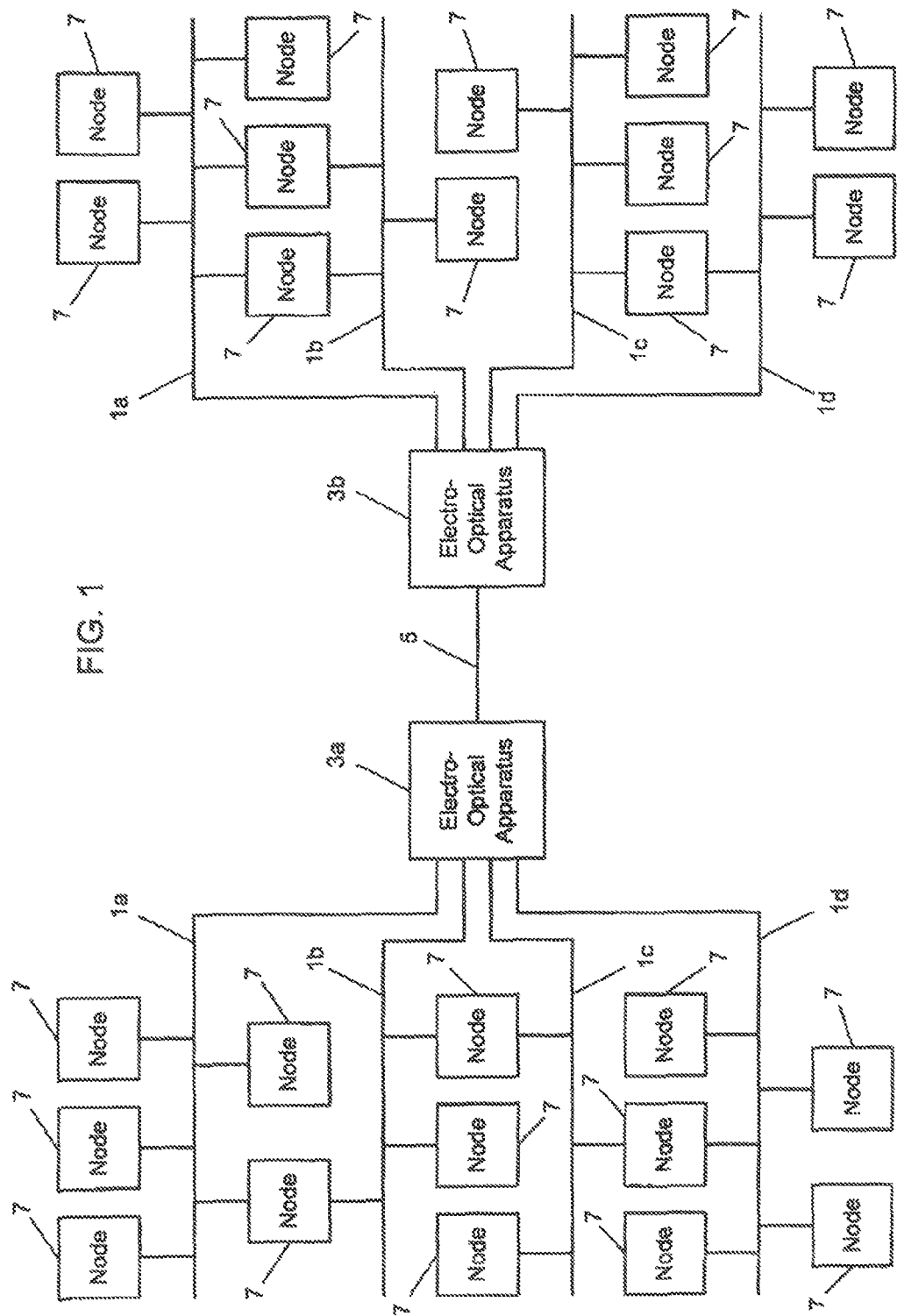
FIG. 1 is a block diagram schematically showing an electrical bus network system.

An electrical bus network system is depicted in FIG. 1. As shown, the electrical bus network system 10 includes four serial electrical busses 1a-1d. Each serial electrical bus 1 has a first part that is connected to a first electro-optical apparatus 3a and a second part that is connected to a second electro-optical apparatus 3b, with the first and second electro-optical apparatuses being interconnected by an optical fiber 5. In this way, each serial electrical bus 1 is optically extended, with the signals on the four serial electrical buses being sent in parallel over the optical fiber 5.

In this embodiment, each serial electrical bus 1 is a 1553-type data bus complying with the MIL-STD-1553 protocol. A plurality of nodes 7 are connected to each serial electrical bus 1, with each node 7 being able to function as one or more of a bus controller, a remote terminal or a bus monitor of a 1553-type data bus. As shown, some nodes 7 are connected to two serial electrical busses 1. It will be appreciated that nodes 7 could be connected to three or more of the serial electrical busses 1.

A node 7 connected to a serial electrical bus 1 can communicate with other nodes 7 connected to the same serial electrical data bus 1 in accordance with the conventional MIL-STD-1553 protocol. In this embodiment the insertion of the optical extension to each serial electrical bus 7 is transparent to the nodes 7. As will be discussed in detail hereafter, each electro-optical apparatus includes processing circuitry to facilitate this transparency.

Figure 2:
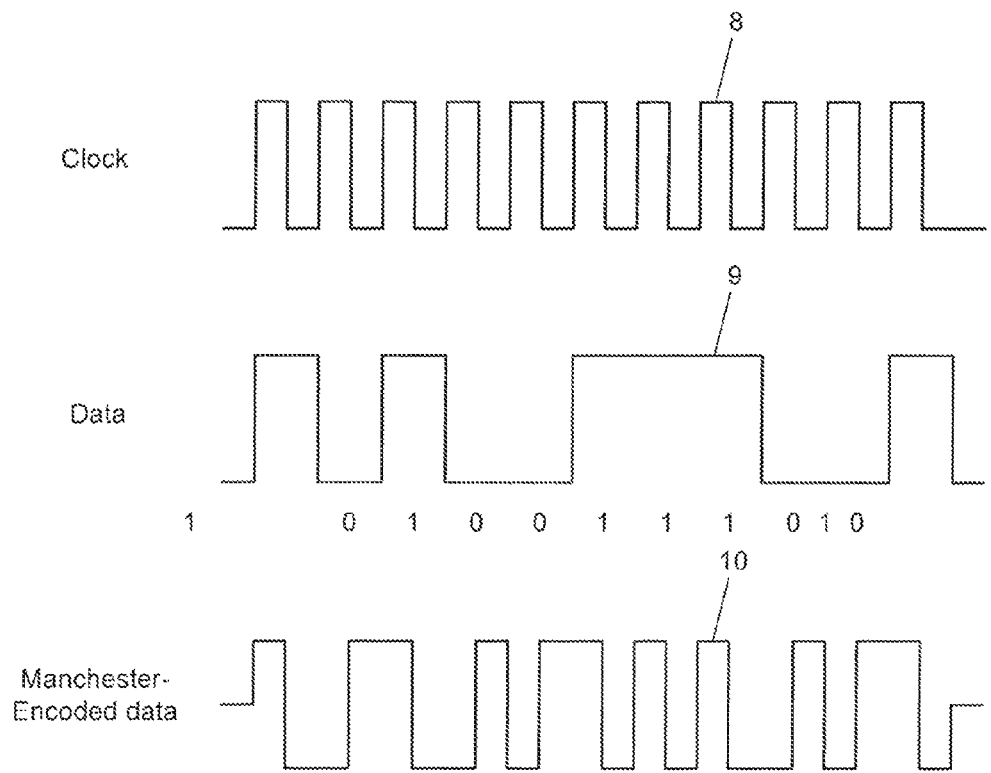
FIG. 2 schematically shows a clock signal, a data signal and a Manchester-encoded signal.

In accordance with the MIL-STD-15.53 protocol, in this embodiment data is transmitted on the serial electrical busses 1 using Manchester encoding and a two-wire differential pair. In particular, as shown in FIG. 2, a clock signal 8 and a data signal 9 are combined in a Manchester-encoded signal 10, with a logic one being transmitted as a bipolar coded signal 1/0 (i.e. a positive pulse followed by a negative pulse) and a logic zero being transmitted as a bipolar coded signal 0/1 (i.e. a negative pulse followed by a positive pulse). In this way, transitions occur in the Manchester-encoded signal 10 at intervals corresponding to the duration of a data bit, facilitating clock recovery from the Manchester-encoded signal 10.

Figure 3:
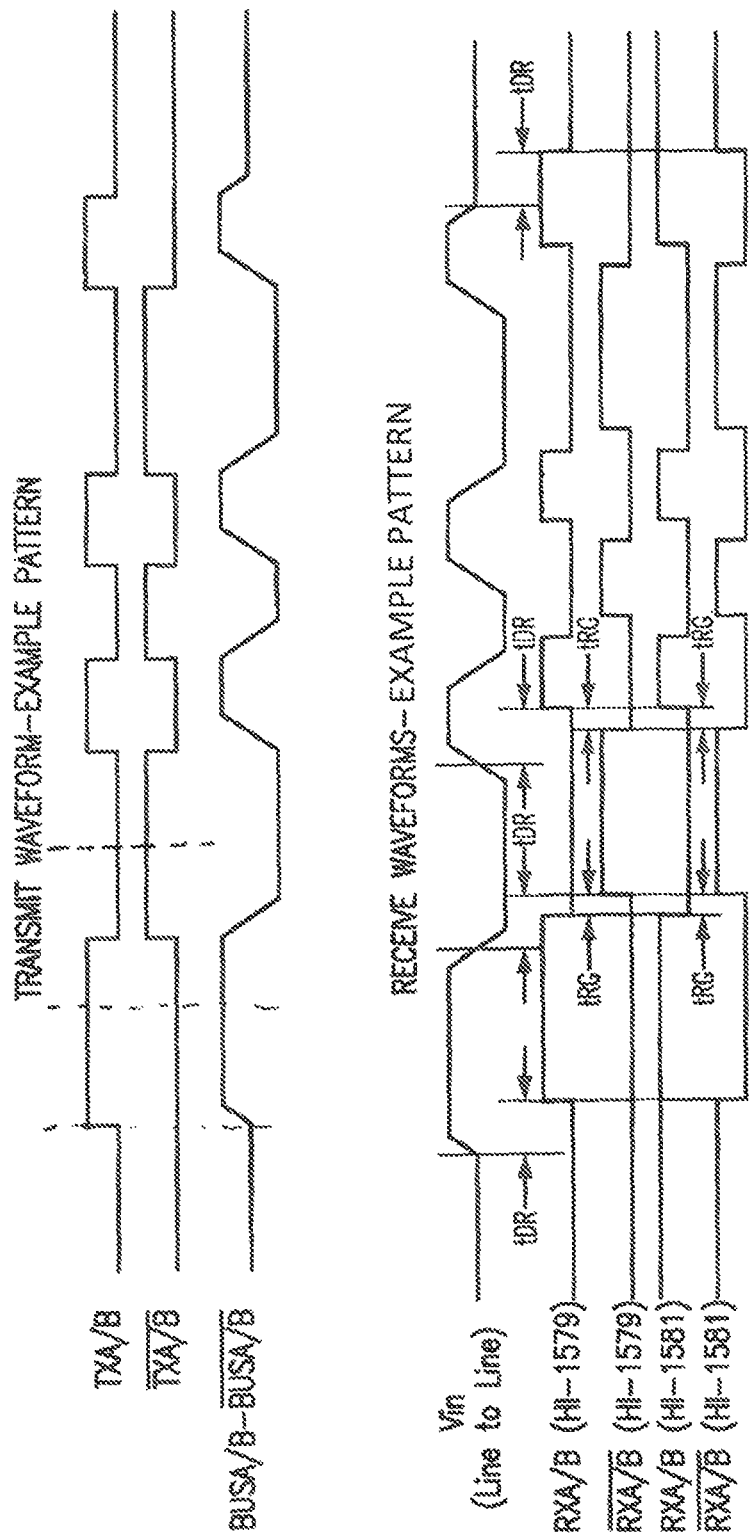
FIG. 3 shows transmit and receive waveforms in a 1553-type electrical bus.

FIG. 3 shows exemplary transmit and receive waveforms. As the bus voltage swing is typically 20 to 30 volts, there is a significant rise time on the electrical bus for each positive transition and similarly a significant fall time on the bus for each negative transition. FIG. 3 shows data signals output by conventional 1553-type electrical transceivers (in particular HI-1579 and HI-1580 monolithic dual transceivers available from Holt Integrated Circuits, Inc.) of Mission Viejo, Calif. It can be seen that there is a large receiving propagation delay of up to 450 ns which combined with a transmitting delay of 150 ns introduces a total delay of 0.6 μs. In addition, there is a large receiving signal distortion of between 90 ns and 365 ns.

In conventional 1553-type networks without optical extension, each node 7 includes a 1553-type electrical transceiver such as the HI-1579 electrical transceiver, and data on the electrical bus can be reliably recovered by the nodes 7. In this embodiment, each of the electro-optical apparatuses 3 also includes a HI-1579 electrical transceiver for each serial electrical bus 1 in order to detect signals on the corresponding serial electrical bus 1 and to transmit signals on the corresponding serial electrical bus 1. This introduces additional signal distortion which is reduced by the electro-optical apparatuses 3 in order for the signals transmitted through the optical fiber 5 to be recoverable by the nodes 7.

Figure 4:
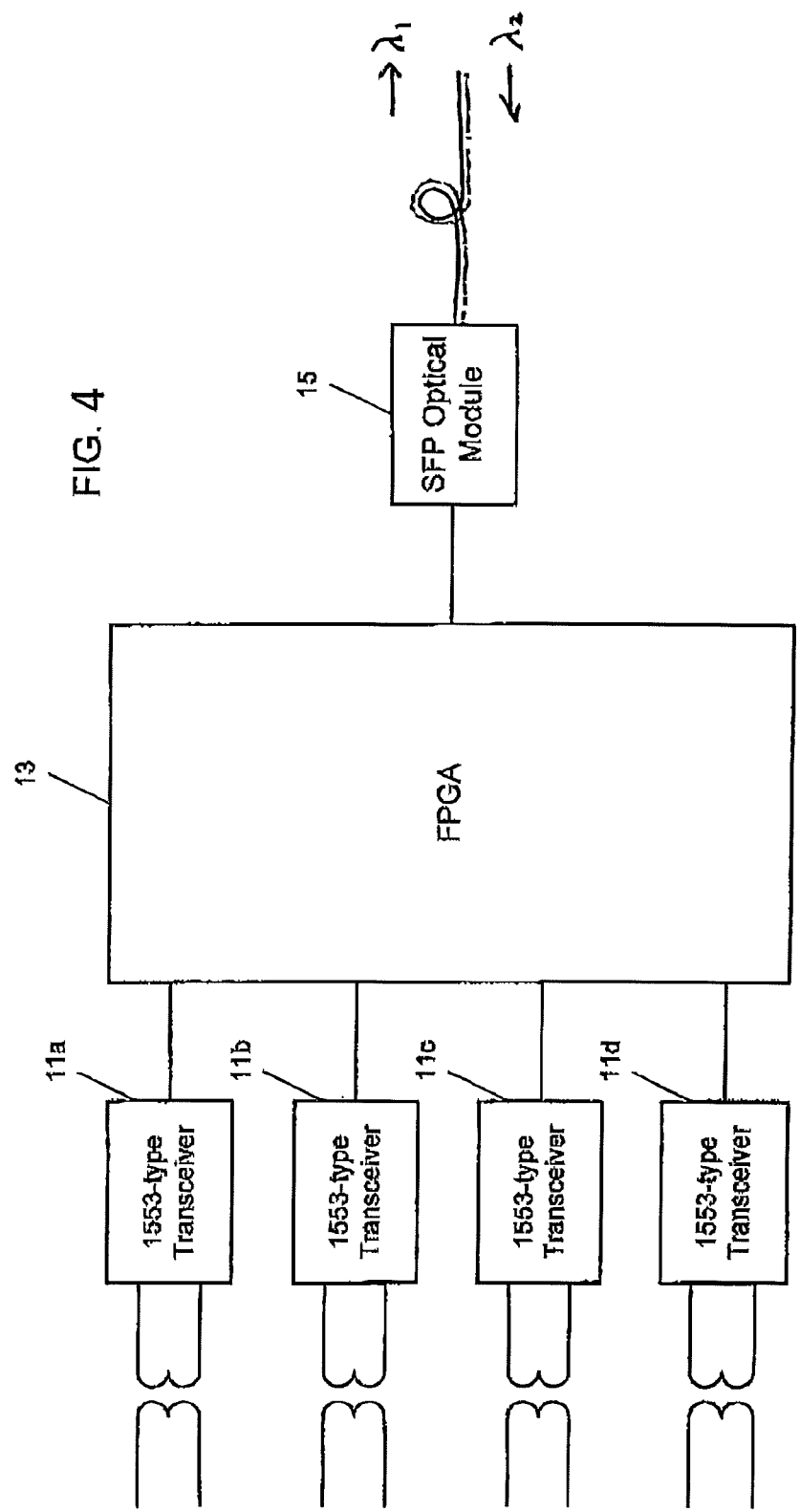
FIG. 4 is a block diagram schematically showing the main components of an electro-optical apparatus forming part of the electrical bus network system illustrated in FIG. 1.

The main components of each electro-optical apparatus 3 are schematically shown in FIG. 4. A 1553-type transceiver 11, in this embodiment a HI-1579 electrical transceiver, is connected to each serial electrical bus 1 by a 1553-type direct coupling. Each 1553-type transceiver 11 is also connected to Field Programmable Gate Array (FPGA) 13, in this embodiment a Cyclone IV FPGA. A Small Form-Factor Pluggable (SFP) optical module 15 is also connected to the FPGA 13. In this embodiment, the SFP optical module 15 is a 4×10 Gbps QSFP+ LR4 optical transceiver manufactured by Emcore Corporation, of Albuquerque, N. Mex. The 1553-type transceivers 11, the FPGA 13 and the SFP optical module 15 are mounted on a printed circuit board (not shown) to form a printed circuit board assembly (PCBA).

Although the presently described implementation utilizes an SFP transceiver module, it is noted that optical transceiver modules may be packaged in a number of standard form factors which are "hot pluggable" into a rack mounted line card network unit or the chassis of the data system unit. Standard form factors set forth in Multiple Source Agreements (MSAs) provide standardized dimensions and input/output interfaces that allow devices from different manufacturers to be used interchangeably. Some of the most popular MSAs include XENPAK (see www.xenpak.org), X2 (see www.X2msa.org), SFF ("small form factor"), SFP ("small form factor pluggable"), XFP ("10 Gigabit Small Form Factor Pluggable", see www.XFPMSA.org), and the 300-pin module (see www.300pinmsa.org), and other embodiments may utilize any of these or similar form factors.

Figure 5:
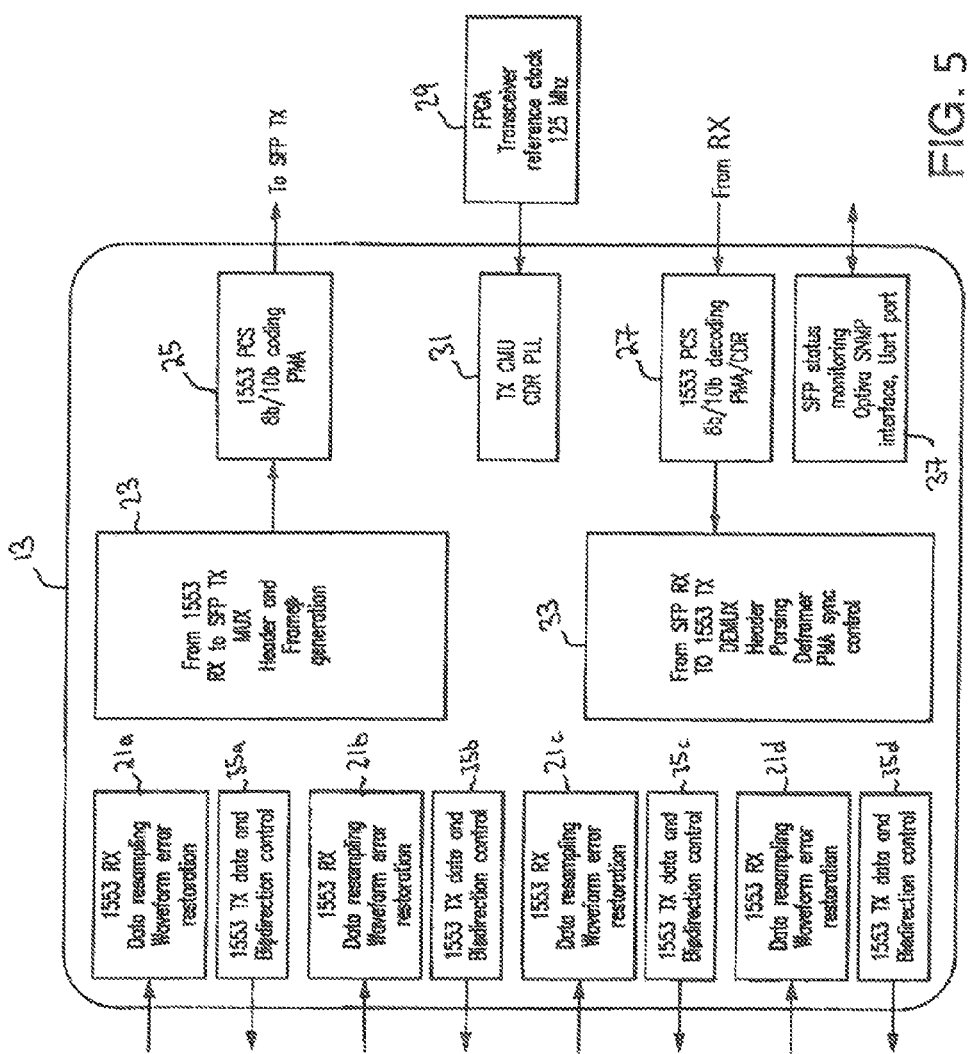
FIG. 5 schematically shows the main processing modules of a Field Programmable Gate Array forming part of the electro-optical module illustrated in FIG. 3.

FIG. 5 schematically shows the main functional modules of the FPGA 13. As will be discussed in more detail hereafter, the functional modules of the FPGA 13 are designed so that the electrical signal in the part of a serial electrical bus 1 on one side of the optical fiber is substantially reproduced in the part of that serial electrical bus 1 on the other side of the optical fiber 5.

Figure 6:
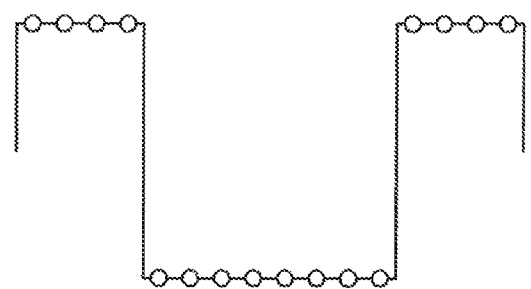
FIG. 6 shows oversampling of two Manchester-encoded data bits.

As shown in FIG. 5, signals received by the FPGA 13 from a 1553-type transceiver 11 are processed by a data resampling and waveform error restoration module 21a-21d. In this embodiment, data from the 1553-type transceivers 11 is oversampled by a factor of 150. FIG. 6 schematically shows oversampling of two Manchester-encoded data bits with no distortion, in which for ease of illustration only eight samples per data bit are shown. It will be appreciated that, knowing the bandwidth, the data signal could be reproduced from fewer samples. However, in this embodiment the signals from the 1553-type transceiver 11 are distorted and by using oversampling, the data samples represent the distorted signal received from the 1553-type transceiver 11. While an oversampling factor of 150 is used in this embodiment, generally any oversampling factor in excess of 50 could be used.

The oversampled data from the four 1553-type transceivers 11 is then multiplexed and formed into frames with headers by a Multiplex Header and Frame Generation module 23. The data frames are then processed by a Physical Coding Sublayer (PCS)/Physical Medium Attachment (PMA) encoding module 25, which performs 8 b/10 b encoding and forms the coded data into frames which are output for transmission in the optical fiber 5 by the SFP optical module 15. Sending digital versions of the distorted signals received from the 1553-type transceivers 11 through the optical fiber 5 has an advantage over performing Manchester decoding and then transmitting the decoded signals through the optical fiber 5 in that the propagation delay is less. It will be appreciate that alternative encoding schemes could be used in place of the 8 b/10 b encoding, for example 64 b/66 b encoding.

Signals received from the SFP optical module 15 are decoded by a PCS/PMA decoding module 27, which uses a K control word of the 8 b/10 b encoding scheme for de-serializer synchronization and an on-board 125 MHz clock 29 as a reference for a clock multiplier unit (CMU) 31 to perform clock data recovery to allow 8 b/10 b decoding in order to recover the data frames. The recovered data frames are then de-multiplexed by a demultiplexer module 33.

As discussed previously, the de-multiplexed data output by the demultiplexer module 33 for each serial electrical bus 1 corresponds to a distorted signal. Inputting such a distorted signal directly into a 1553-type transceiver 11 would result in a signal on the serial electrical bus 11 that is too distorted to be recovered by the nodes 7, bearing in mind that the 1553-type transceiver 11 will introduce some additional signal distortion, and could also lead to signal oscillation in the serial electrical bus 1. To address this, the de-multiplexed data is processed by a 1553 TX data and bi-direction control module 35a-35d prior before being output to the 1553-type transceiver 11 corresponding to that serial electrical bus 1.

The 1553 TX data and bi-direction control module 35 recovers the Manchester bit timing using a transition window having a duration corresponding to half a Manchester code bit period. For a 1553-type serial electrical bus, the transition window has a duration of 500 μs. As the distortion is sufficiently large that transitions could occur at any point within the Manchester code bit period, a timing reference must be determined which minimizes errors and violations in the Manchester-encoded data. As shown in FIG. 7, a data word communicated by a 1553-type network starts with a SYNC bit 41 having a high level for a duration corresponding to one and a half bits and a low level for a duration of one and a half bit. A starting time reference T for the decision window is set at the falling edge of the SYNC bit 41, and decision windows 43a-43i are then set centered at integer multiples of the bit duration (i.e. 1 ms) after the starting time reference T.

The FPGA 13 also includes a SFP status monitoring Optiva SNMP interface 37 for monitoring the optical link.

FIG. 7, for ease of illustration, shows an ideal case where each bit value transition is centered in the middle of a decision window 43. In practice, this will not be the case. To address this, in this embodiment the timing reference is dynamically adjusted by varying the timing so that transitions occur in the center of the corresponding transition window 43 and testing the signals output to the serial electrical bus 1 for error rate and bit violations. In this way, the timing reference T can be dynamically adjusted to minimize the bit errors and violations. In this embodiment, standard least mean square (LMS) and second order proportional integral (PI) control loop methods are used to track the time reference T.

A Manchester-encoded signal should have a DC bias of zero. However, electrical imperfections in the transceivers can lead to a DC bias in excess of 100 mV or less than −100 mV. To compensate for this, the 1553 TX data and bi-direction control module introduces a compensating signal modification which we refer to as pre-distortion. In particular, if the DC bias is less than −100 mV then one or more sample periods, as determined by the oversampling clock, are added in the positive bit period to increase the DC bias level, whereas if the DC bias is more than 100 mV then one or more sample periods are added in the negative bit period to reduce the DC bias. As the CMOS components of the 1553-type transceiver 11 provide stable distortion, the required amount of pre-distortion can be determined by a calibration procedure.

The serial electrical bus 1 is bi-directional, but can only work in a half-duplex mode. To prevent oscillation, when an electro-optical apparatus 13 receives signals transmitted over the optical fiber 5, the FPGA 11 disables processing of signals from the receivers of the 1553-type transceivers.

FIG. 8 summarizes how the FPGA 13 processes signals from the transceiver apparatus 11. As shown, the FPGA 13 oversamples, at 52, electrical data signals from the transceiver apparatus 11. The FPGA 13 the converts, at 54, the oversampled data into optical data signals that are for transmission, at 56, as optical data signals. Although this is used in the illustrated embodiment in the context of a bi-directional optical data link, it will be appreciated that this technique could equally be applied in the transmitter of a unidirectional optical data link.

Figure 9:
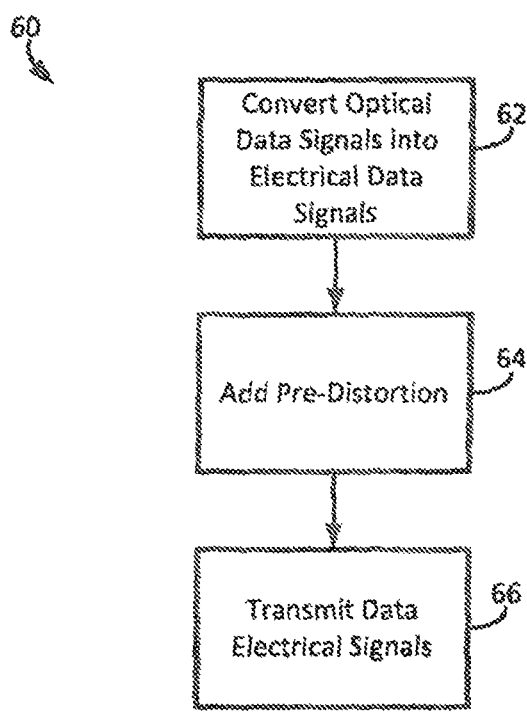
FIG. 9 is a flow chart showing operations performed by the electro-optical apparatus illustrated in FIG. 3 on receipt of an optical signal.

FIG. 9 summarizes how the electro-optical apparatus 3 processes signals from the optical fiber 5. As shown, the electro-optical apparatus 3 converts, at 62, optical data signals into electrical data signals. The electro-optical apparatus 3 then adds, at 64, pre-distortion before transmitting, at 66, the electrical signals. Although this is used in the illustrated embodiment in the context of a bi-directional optical data link, it will be appreciated that this technique could equally be applied in the receiver of a unidirectional optical data link. It will be appreciated that the invention can be applied with electrical data busses complying with protocols different from the MIL-STD-1553 protocol. For example, the invention could apply to RS-232, the RS-422, the RS-485, and the IEEE-488 (GP-IB/HP-IB) protocols. Other possible protocols supportable by an appropriate protocol module that can generally be used with embodiments of the invention include, but are not limited to, IEEE-488.1 and IEEE-488.2 (general purpose interface), IEEE-802.3 (Local Area Network and Ethernet standards), ISO 11898-2 (CAN high-speed standard), ISO 11898-3 (CAN fault-tolerant (low-speed) standard), ISO 11992-1 (CAN fault-tolerant standard for truck/trailer communication), ISO 11783-2 (250 kbit/s, Agricultural Standard), SAE J1939-11 (250 kbit/s, Shielded Twisted Pair (STP) standard), SAE J1939-15 (250 kbit/s, UnShielded Twisted Pair (UTP) reduced layer standard), and the SAE J2411 (Single-Wire CAN (S WC) standard).

In the illustrated embodiment, a FPGA 13 is used to perform a plurality of processing programs or routines such as programs or routines for signal processing. It will be appreciated that other processing apparatuses could be used in place of the FPGA 13. For example, the FPGA 13 could be replaced by one or more of a microprocessor, a Digital Signal Processor (DSP), an Application Specific Integrated Circuit (ASIC), or any other equivalent integrated or discrete logic circuitry. The term "processing apparatus" may generally refer to any of the foregoing programmable apparatus and/or logic circuitry, alone or in combination with other logic circuitry, or any other equivalent circuitry.

In this respect, the invention extends to computer programs, particularly computer programs on or in a carrier, adapted for putting the invention into practice. The program may be in the form of source code, object code, a code intermediate to source code and object code such as in partially compiled form, or in any other form suitable for using in the implementation of the processes according to the invention.

The carrier may be any entity or device capable of carrying the program. For example, the carrier may comprise a storage medium, such as a ROM, for example a CD-ROM or non-volatile semiconductor memories, or a magnetic recording medium, for example a floppy disc or a hard disc, or an optical recording medium. Further, the carrier may be a transmissible carrier such as an electronic or optical signal which may be conveyed via electrical or optical cable or by radio or other means.

The carrier may be an integrated circuit in which the program is embedded, or an integrated circuit adapted for performing the program steps, or for use in the performance of the relevant processes. Some or all of the processing apparatus may be implemented in an Application Specific Integrated Circuit (ASIC) or a Field Programmable Gate Array (FPGA).

What is claimed:

1. A communications network comprising:
   a first bidirectional serial electrical bus having a first data rate and using a predetermined electrical data protocol for coupling with a plurality of network nodes;
   a first interface controller coupled to the first bidirectional serial electrical bus for sampling signals received from the first bidirectional serial electrical bus at a sampling rate at least fifty times larger than the first data rate and encoding resultant sampled data into a second digital signal for transmission at a second data rate substantially greater than the first data rate;
   an electro-optical transmitter coupled to the first interface controller for converting the second digital signal into an optical signal at a first optical frequency for transmission over an optical fiber;
   an optical fiber coupled to the electro-optical transmitter for transmitting the optical signal to a remote receiver;
   an electro-optical receiver coupled to the optical fiber for converting the optical signal into an electrical signal; and
   a second interface controller coupled to the electro-optical receiver for decoding the electrical signal from the electro-optical receiver and processing the decoded electrical signal to generate a digital signal for transmission on a second bidirectional serial electrical bus using said predetermined electrical data protocol, wherein the second interface controller comprises a pre-distorter arranged to add pre-distortion to compensate for signal distortion.

2. The communications network of claim 1, wherein the first interface controller is arranged to sample signals received from the first bidirectional serial electrical bus at a sampling rate 150 times larger than the first data rate.

3. The communication network of claim 1, wherein the signals on the first bidirectional serial electrical bus correspond to Manchester-encoded data signals.

4. The communications network of claim 3, wherein the second interface controller is arranged to recover the timing of the Manchester-encoded data signals by dynamic adjustment of a starting time reference for a decision window.

5. The communications network of claim 4, wherein the second interface controller is arranged to apply a transition window corresponding to half a Manchester code bit period.

6. The communications network of claim 1, wherein the pre-distorter is arranged to add said pre-distortion in the generation of the digital signal for transmission.

7. The communications network of claim 6, wherein the pre-distorter is operable to shift a bias level of the digital signal for transmission.

8. The communications network of claim 1, wherein the second interface controller is arranged to add a sample period extension in either positive or negative bias to adjust a DC bias of the electrical signals in the first and second bidirectional serial electrical buses.

9. The communications network of claim 1, wherein the first interface controller is implemented on a single integrated circuit device.

10. The communications network of claim 9, wherein the single integrated circuit device is a Field Programmable Gate Array.

11. An integrated circuit device comprising:
a first interface controller for sampling signals received from a serial bidirectional electrical bus at a sampling rate, wherein the received signals are at a first data rate and the sampling rate is at least fifty times larger than the first data rate, and encoding the sampled data into a second digital signal for transmission at a second data rate substantially greater than the first data rate, and
a second interface controller coupled for decoding an electrical signal at the second data rate and processing the decoded electrical signal to generate a digital signal for transmission on the bidirectional serial electrical bus using a predetermined electrical data protocol, wherein the second interface controller is arranged to recover the timing of Manchester-encoded digital data by dynamic adjustment of a starting time reference for a decision window, and wherein the second interface controller is arranged to apply a transition window corresponding to half a Manchester code bit period.

12. The integrated circuit device of claim 11, wherein the sampling rate is at least 150 times larger than the first data rate.

13. The integrated circuit device of claim 11, wherein the second interface controller comprises a pre-distorter arranged to introduce pre-distortion to compensate for distortion generated on transmission to the serial bidirectional electrical bus.

14. The integrated circuit device of claim 13, wherein the pre-distorter is operable to shift a bias level of the digital signal for transmission.

15. A non-volatile storage medium comprising instructions for programming a programmable apparatus to sample signals received from a serial bidirectional electrical bus at a sampling rate, wherein the received signals are at a first data rate and the sampling rate is at least fifty times larger than the first data rate, and to encode the sampled data into a second digital signal for transmission at a second data rate substantially greater than the first data rate; and further comprising (i) instructions for decoding an electrical signal received at the second data rate and processing the decoded electrical signal to generate a digital signal for transmission on the bidirectional serial electrical bus using a predetermined electrical data protocol; and (ii) instructions for introducing pre-distortion to compensate for distortion generated on transmission of the digital signal on the serial electrical bus, wherein the instructions for introducing pre-distortion include instructions to shift a bias level of the digital signal for transmission.

16. A communications network comprising:
a first bidirectional serial electrical bus having a first data rate and using a predetermined electrical data protocol for coupling with a plurality of network nodes;
a first interface controller coupled to the first bidirectional serial electrical bus for sampling signals received from the first bidirectional serial electrical bus at a sampling rate at least fifty times larger than the first data rate and encoding resultant sampled data into a second digital signal for transmission at a second data rate substantially greater than the first data rate;
an electro-optical transmitter coupled to the first interface controller for converting the second digital signal into an optical signal at a first optical frequency for transmission over an optical fiber;
an optical fiber coupled to the electro-optical transmitter for transmitting the optical signal to a remote receiver;
an electro-optical receiver coupled to the optical fiber for converting the optical signal into an electrical signal; and
a second interface controller coupled to the electro-optical receiver for decoding the electrical signal from the electro-optical receiver and processing the decoded electrical signal to generate a digital signal for transmission on a second bidirectional serial electrical bus using said predetermined electrical data protocol,
wherein the signals on the first bidirectional serial electrical bus correspond to Manchester-encoded data signals, wherein the second interface controller is arranged to recover the timing of the Manchester-encoded data signals by dynamic adjustment of a starting time reference for a decision window, and wherein the second interface controller is arranged to apply a transition window corresponding to half a Manchester code bit period.

17. The communications network of claim 16, wherein the first interface controller is arranged to sample signals received from the first bidirectional serial electrical bus at a sampling rate 150 times larger than the first data rate.

18. An integrated circuit device comprising:
a first interface controller for sampling signals received from a serial bidirectional electrical bus at a sampling rate, wherein the received signals are at a first data rate and the sampling rate is at least fifty times larger than the first data rate, and encoding the sampled data into a second digital signal for transmission at a second data rate substantially greater than the first data rate, and
a second interface controller coupled for decoding an electrical signal at the second data rate and processing the decoded electrical signal to generate a digital signal for transmission on the bidirectional serial electrical bus using a predetermined electrical data protocol, wherein the second interface controller comprises a pre-distorter arranged to introduce pre-distortion to compensate for distortion generated on transmission to the serial bidirectional electrical bus.

19. The integrated circuit device of claim 18, wherein the pre-distorter is operable to shift a bias level of the digital signal for transmission.

20. The integrated circuit device of claim 18, wherein the second interface controller is arranged to recover the timing of Manchester-encoded digital data by dynamic adjustment of a starting time reference for a decision window.

* * * * *